C. H. BAKER.
SPRAYING DEVICE.
APPLICATION FILED AUG. 31, 1914.
1,154,833.
Patented Sept. 28, 1915.
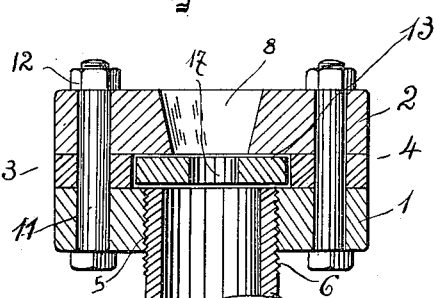
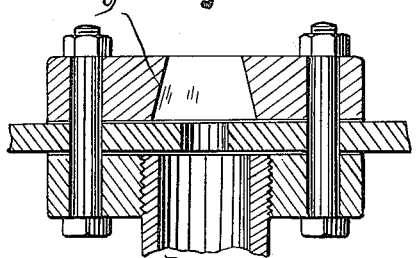
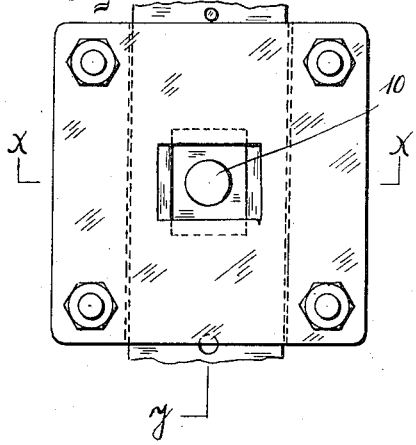
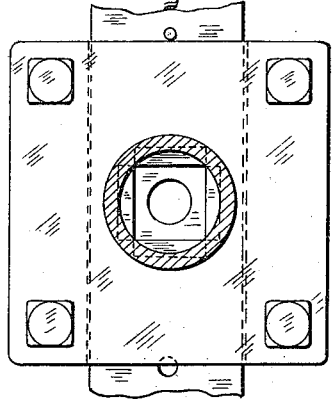
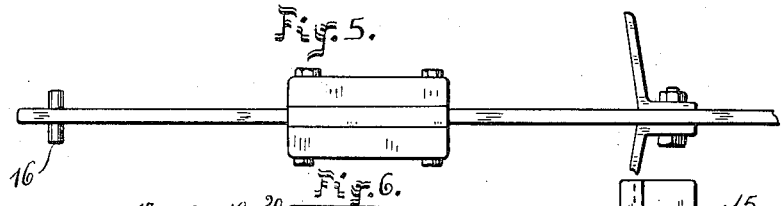
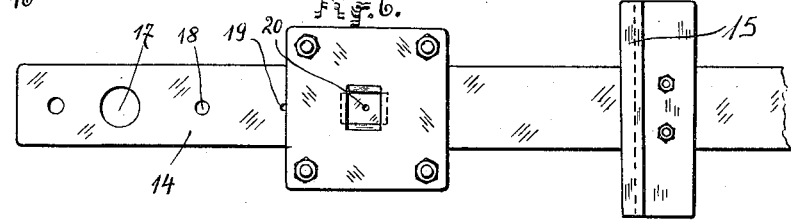
WITNESSES
INVENTOR
C. H. Baker
By Henry C. Evert
ATTORNEYS

UNITED STATES PATENT OFFICE.

CHARLES H. BAKER, OF PITTSBURGH, PENNSYLVANIA.

SPRAYING DEVICE.

1,154,833.   Specification of Letters Patent.   Patented Sept. 28, 1915.

Application filed August 31, 1914. Serial No. 859,491.

*To all whom it may concern:*

Be it known that I, CHARLES H. BAKER, a citizen of the United States of America, residing at Pittsburgh, in the county of Allegheny and State of Pennsylvania, have invented certain new and useful Improvements in Spraying Devices, of which the following is a specification, reference being had therein to the accompanying drawing.

This invention relates to a spraying device and has for its object to provide a device of such class, in a manner as hereinafter set forth, for more particularly spraying lime, but it is to be understood that the device can be used for any purpose wherein it is found applicable.

A further object of the invention is to provide a spraying device for the purpose set forth, in a manner as hereinafter set forth, with means to overcome the clogging when the device is employed for spraying purposes.

A further object of the invention is to provide a spraying device for the purpose set forth, with means in a manner as hereinafter referred to, for controlling or regulating the discharge during a spraying operation.

A further object of the invention is to provide a spraying device which is simple in its construction and arrangement, strong, durable, efficient and convenient in its use, readily set up, and comparatively inexpensive to manufacture.

With the foregoing and other objects in view the invention consists of a novel construction, combination and arrangement of parts, as hereinafter more specifically described and illustrated in the accompanying drawings, wherein is shown an embodiment of the invention, but it is to be understood that changes, variations and modifications can be resorted to which comes within the scope of the claim hereunto appended.

In the drawings wherein like reference characters denote corresponding parts throughout the several views:—Figure 1 is a top plan view of the device, a controlling or regulating member being broken away. Fig. 2 is a sectional elevation of the device, broken away. Fig. 3 is a section on line X X, Fig. 1. Fig. 4 is a sectional view on line Y Y of Fig. 1, looking in the direction of the arrow. Fig. 5 is a side elevation. Fig. 6 is a top plan view of the device.

Referring in detail to the drawing, 1 and 2 denote respectively the lower and upper head members, having interposed therebetween the spacing members 3 and 4, the latter having the edges thereof flush with the edges in said head members. Each of the heads is rectangular in contour and the head 1 is formed with a centrally disposed circular threaded opening 5 and engaging with said threaded opening are the peripheral threads 6 of a supply pipe 7, the latter is flush with the upper face of the plate 1. The plate 2 is formed with an opening rectangular in plan and the side walls of said opening are indicated at 8 and the end walls at 9. The opening is referred to by the reference character 10 and the walls thereof are beveled, but the walls 8 are oppositely beveled with respect to the walls 9.

The spacing members 3, 4 and the head plates 1, 2 are secured together by headed bolts 11, which extend through the plates and members and are provided on their upper ends with nuts 12 whereby when these latter are screwed home the plates and members are clamped together.

The spacing members 3, 4 provide, in connection with the plates 1, 2, a longitudinal passage 13 through which is adapted to be shifted a controlling or regulating element which is formed of a flat rectangular bar 14, provided near one end with a handle 15. and near its other end with a stop pin 16. The bar 14 is formed with openings 17, 18, 19 and 20. The opening 17 is of materially greater diameter than the opening 18, the latter is of greater diameter than the opening 19 and the latter is of greater diameter than the opening 20. If by way of example the opening 20 is positioned in alinement with a supply pipe 7 and the opening 10 should become clogged, the bar 14 is shifted to register one of the larger openings therein with the pipe 7 and as a greater flow of material is had through the bar the clogging of the opening 10 is overcome.

What I claim is:—

A spraying device comprising a pair of head plates having central alining openings therein, spacing members therebetween, means to secure said head plates and spacing members together, the opening in the top head plate being rectangular in plan and tapering and the opening in the other head plate being enlarged and threaded for engagement with a supply pipe and a discharge controlling device consisting of a sliding bar arranged between the plates and spacing members, said bar having a plurality of openings of various sizes therein adapted to register with the aforesaid alining openings of the head plates, a handle member at one end of said bar for operating the same and limiting the movement thereof in one direction and means at the opposite end of the bar to limit the movement of the latter in the opposite direction.

In testimony whereof I affix my signature in the presence of two witnesses.

CHARLES H. BAKER.

Witnesses:
J. SAM MELTON,
F. J. HUNTER.